(12) United States Patent
Goode et al.

(10) Patent No.: US 6,282,836 B1
(45) Date of Patent: Sep. 4, 2001

(54) ADJUSTABLE SUPPORT SYSTEM FOR TREES

(76) Inventors: Clifford E. Goode; Sadie M. Goode, both of 1501 E. Grant Rd., El Nido, CA (US) 95317

( * ) Notice: Subject to any disclaimer, the term of this patent is extended or adjusted under 35 U.S.C. 154(b) by 0 days.

(21) Appl. No.: 09/382,509

(22) Filed: Aug. 25, 1999

Related U.S. Application Data

(63) Continuation-in-part of application No. 09/036,407, filed on Mar. 5, 1998, now abandoned.

(51) Int. Cl.[7] .................................................. A01G 7/00
(52) U.S. Cl. ............................................................. 47/43
(58) Field of Search ........................... 47/42, 43; 52/111; 248/354.3; D8/1

(56) References Cited

U.S. PATENT DOCUMENTS

| | | |
|---|---|---|
| 9,893 | 7/1853 | Bennett . |
| 13,341 | 11/1855 | Makin et al. . |
| D. 260,960 * | 9/1981 | Malia ............................................ D8/1 |
| D. 332,729 | 1/1993 | Sessions . |
| D. 335,802 | 5/1993 | Klump . |
| 469,246 | 2/1892 | Hoffman . |
| 497,853 | 5/1893 | Wright . |
| 499,520 * | 6/1893 | Cook ............................................ 47/43 |
| 567,813 | 9/1896 | Morgan . |
| 601,782 | 4/1898 | Speer . |
| 694,247 | 2/1902 | Brown . |
| 740,741 | 10/1903 | Brown . |
| 757,487 | 4/1904 | Brown . |
| 918,579 | 4/1909 | Murch . |
| 992,514 | 5/1911 | Messler . |
| 1,080,758 | 12/1913 | Glascock . |
| 1,214,142 * | 6/1917 | Dingwall ...................................... 47/43 |
| 1,227,105 * | 5/1917 | Barnes ..................................... 248/354.3 |
| 1,234,960 | 7/1917 | Talbert . |
| 1,693,180 | 11/1928 | Phelp . |
| 1,718,971 | 7/1929 | Mueller . |
| 1,974,367 | 9/1934 | Schaible . |
| 1,976,264 | 10/1934 | Miner et al. . |
| 2,862,334 | 12/1958 | Sandvig . |
| 3,040,477 | 6/1962 | June . |
| 3,307,305 * | 3/1967 | Atkinson ................................ 52/111 |
| 4,021,965 | 5/1977 | Norris . |
| 4,222,198 | 9/1980 | Napolitano et al. . |
| 4,318,246 | 3/1982 | Jungbluth et al. . |

(List continued on next page.)

FOREIGN PATENT DOCUMENTS

| | | | |
|---|---|---|---|
| 242296 * | 9/1946 | (CH) | ..................................... 47/42 |
| 463 292 | 2/1927 | (DE) . | |
| 926 821 | 4/1955 | (DE) . | |
| 2407496 | 1/1974 | (DE) . | |
| 3810570 | 10/1989 | (DE) . | |
| 688846 | 3/1953 | (GB) . | |
| 2130863 | 6/1984 | (GB) . | |
| 63488 | 3/1913 | (SE) . | |
| 90300 | 9/1937 | (SE) . | |
| 124113 | 2/1949 | (SE) . | |

*Primary Examiner*—Charles T. Jordan
*Assistant Examiner*—Francis T. Palo

(57) ABSTRACT

An adjustable support system for trees for stabilizing limbs and a trunk of a tree. The system includes a stake portion having a tapered lower end and a planar upper end. The tapered lower end penetrates a recipient surface adjacent to a tree. A support pole couples with the planar upper end of the stake portion. A plurality of support collars are slidably coupled with the upper section of the support pole. Each of the support collars have a peripheral flange extending outwardly thereof. The peripheral flange has a plurality of circumferentially spaced apertures therethrough. A plurality of support cables are provided with each having inner ends securable to the apertures of the peripheral flange of the support collars. Outer ends of the support cables are looped with rubber hosing disposed thereon for engaging a tree limb.

10 Claims, 3 Drawing Sheets

U.S. PATENT DOCUMENTS

| | | |
|---|---|---|
| 4,319,428 * | 3/1982 | Fox .......................................... 47/42 |
| 4,377,053 | 3/1983 | Roark et al. . |
| 4,519,162 | 5/1985 | Stuckey . |
| 4,649,666 | 3/1987 | Ness et al. . |
| 4,803,802 | 2/1989 | Strumbos . |
| 5,335,448 | 8/1994 | Martinez et al. . |
| 5,341,593 | 8/1994 | Foreman . |
| 5,349,780 | 9/1994 | Dyke . |
| 5,819,720 | 10/1998 | Schubert . |

* cited by examiner

ADJUSTABLE SUPPORT SYSTEM FOR TREES

CROSS REFERENCE TO RELATED APPLICATION

This application is a continuation-in-part of our prior utility patent application Ser. No. 09/036,407, filed Mar. 5, 1998 now abandoned.

BACKGROUND OF THE INVENTION

1. Field of the Invention

The present invention relates to tree supports and more particularly pertains to a new adjustable support system for trees for stabilizing limbs and a trunk of a tree.

2. Description of the Prior Art

The use of tree supports is known in the prior art. More specifically, tree supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art tree supports include U.S. Pat. Nos. 4,649,666 to Ness et al.; 4,519,162 to Stuckey; 5,341,593 to Foreman; 4,803,802 to Strumbos; U.S. Pat. No. Des. 335,802 to Klump; and U.S. Pat. No. Des. 332,729 to Sessions.

While these devices fulfill their respective, particular objectives and requirements, the aforementioned patents do not disclose a new adjustable support system for trees. The inventive device includes a stake portion having a tapered lower end and a planar upper end. The tapered lower end penetrates a recipient surface adjacent to a tree. A support pole couples with the planar upper end of the stake portion. A plurality of support collars are slidably coupled with the upper section of the support pole. Each of the support collars have a peripheral flange extending outwardly thereof. The peripheral flange has a plurality of circumferentially spaced apertures therethrough. A plurality of support cables are provided with each having inner ends securable to the apertures of the peripheral flange of the support collars. Outer ends of the support cables are looped with rubber hosing disposed thereon for engaging a tree limb.

In these respects, the adjustable support system for trees according to the present invention substantially departs from the conventional concepts and designs of the prior art, and in so doing provides an apparatus primarily developed for the purpose of stabilizing limbs and a trunk of a tree.

SUMMARY OF THE INVENTION

In view of the foregoing disadvantages inherent in the known types of tree supports now present in the prior art, the present invention provides a new adjustable support system for trees construction wherein the same can be utilized for stabilizing limbs and a trunk of a tree.

The general purpose of the present invention, which will be described subsequently in greater detail, is to provide a new adjustable support system for trees apparatus and method which has many of the advantages of the tree supports mentioned heretofore and many novel features that result in a new adjustable support system for trees which is not anticipated, rendered obvious, suggested, or even implied by any of the prior art tree supports, either alone or in any combination thereof.

To attain this, the present invention generally comprises a stake portion having a tapered lower end and a planar upper end. The tapered lower end penetrates a recipient surface adjacent to a tree. A support pole is provided having an upper section and a lower section. The lower section telescopically receives the upper section. An open lower end of the lower section couples with the planar upper end of the stake portion. The upper portion has a plurality of apertures therethrough along a length thereof. The lower portion has a pair of radially opposed screws extending inwardly thereof for mating with two of the plurality of apertures to fix a height of the upper section with respect to the lower section. A plurality of support collars are slidably coupled with the upper section of the support pole. The support collars each have four radially disposed screws extending inwardly thereof for engaging the upper section of the support pole. Each of the support collars have a peripheral flange extending outwardly thereof. The peripheral flange has a plurality of circumferentially spaced apertures therethrough. A plurality of support cables are provided with each having inner ends securable to the apertures of the peripheral flange of the support collars. Outer ends of the support cables are looped with rubber hosing disposed thereon for engaging a tree limb.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable support system for trees apparatus and method which has many of the advantages of the tree supports mentioned heretofore and many novel features that result in a new adjustable support system for trees which is not anticipated, rendered obvious, suggested, or even implied by any of the prior art tree supports, either alone or in any combination thereof.

It is another object of the present invention to provide a new adjustable support system for trees which may be easily and efficiently manufactured and marketed.

It is a further object of the present invention to provide a new adjustable support system for trees which is of a durable and reliable construction.

An even further object of the present invention is to provide a new adjustable support system for trees which is susceptible of a low cost of manufacture with regard to both materials and labor, and which accordingly is then susceptible of low prices of sale to the consuming public, thereby making such adjustable support system for trees economically available to the buying public.

Still yet another object of the present invention is to provide a new adjustable support system for trees which provides in the apparatuses and methods of the prior art some of the advantages thereof, while simultaneously overcoming some of the disadvantages normally associated therewith.

Still another object of the present invention is to provide a new adjustable support system for trees for stabilizing limbs and a trunk of a tree.

Yet another object of the present invention is to provide a new adjustable support system for trees which includes a stake portion having a tapered lower end and a planar upper end. The tapered lower end penetrates a recipient surface adjacent to a tree. A support pole couples with the planar upper end of the stake portion. A plurality of support collars are slidably coupled with the upper section of the support pole. Each of the support collars have a peripheral flange extending outwardly thereof. The peripheral flange has a plurality of circumferentially spaced apertures therethrough. A plurality of support cables are provided with each having inner ends securable to the apertures of the peripheral flange of the support collars. Outer ends of the support cables are looped with rubber hosing disposed thereon for engaging a tree limb.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
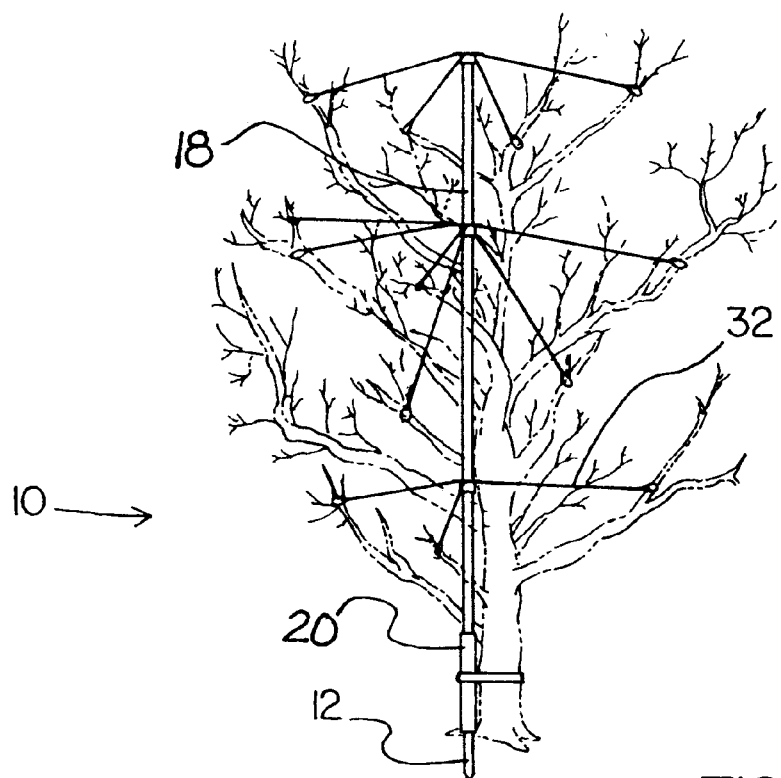
FIG. 1 is a side view of a new adjustable support system for trees according to the present invention illustrated in use.

With reference now to the drawings, and in particular to FIGS. 1 through 5 thereof, a new adjustable support system for trees embodying the principles and concepts of the present invention and generally designated by the reference numeral 10 will be described.

Figure 2:
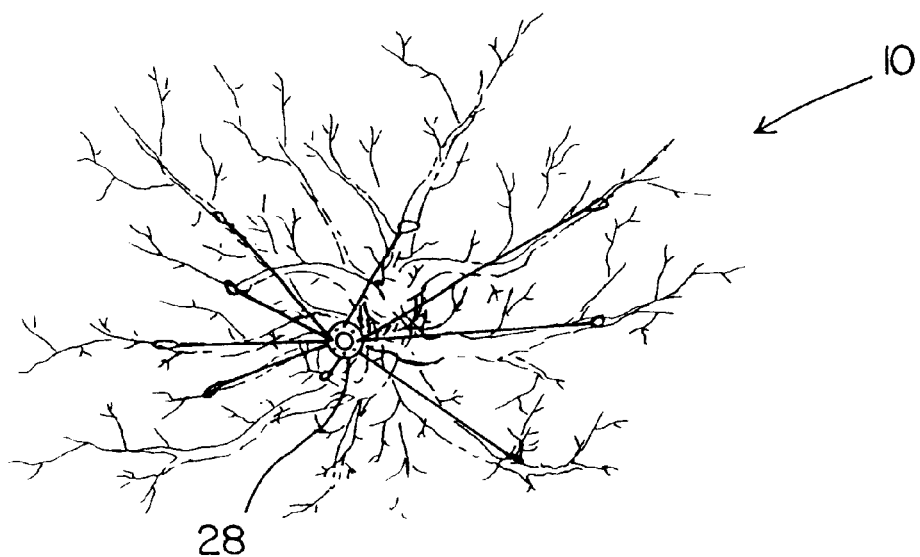
FIG. 2 is a top plan view of the present invention illustrated in use.
Figure 3:
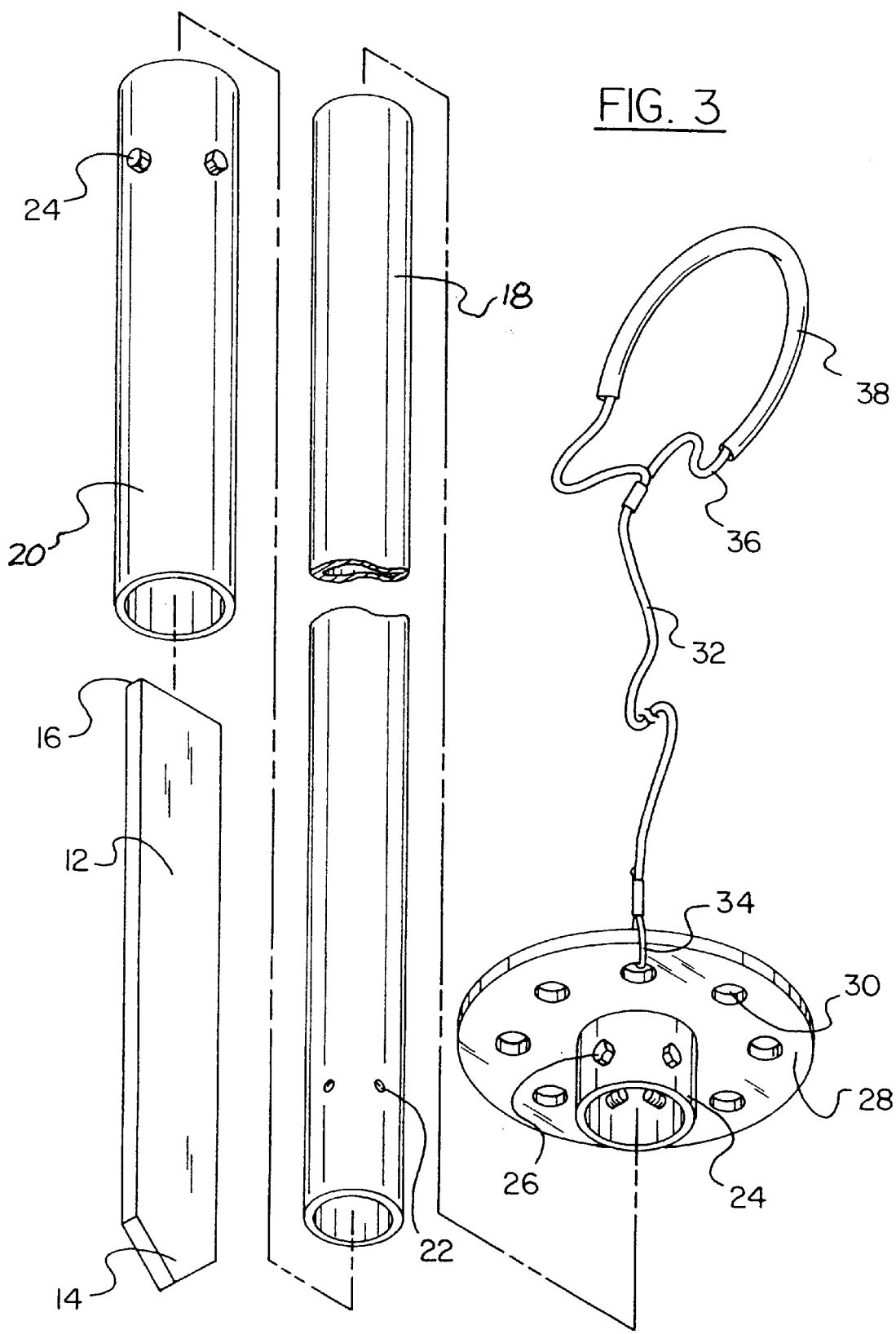
FIG. 3 is an exploded perspective view of the present invention.

As best illustrated in FIGS. 1 through 3, the adjustable support system for trees 10 comprises a stake portion 12 having a tapered lower end 14 and a planar upper end 16. The tapered lower end 14 penetrates a recipient surface adjacent to a tree. The preferable depth that the stake portion 12 penetrates the recipient surface would be twelve inches at the least.

A support pole is provided having an upper section 18 and a lower section 20. The lower section 20 telescopically receives the upper section 18. An open lower end of the lower section 20 couples with the planar upper end 16 of the stake portion 12. The upper portion 18 has a plurality of apertures 22 therethrough along a length thereof. The lower section 20 has a pair of radially opposed screws 24 extending inwardly thereof for mating with two of the plurality of apertures 22 to fix a height of the upper section 18 with respect to the lower section 20.

A plurality of support collars 24 are slidably coupled with the upper section 20 of the support pole. The support collars 24 each have four radially disposed screws 26 extending inwardly thereof for engaging the upper section 20 of the support pole. Each of the support collars 24 have a peripheral flange 28 extending outwardly thereof. The peripheral flange 28 has a plurality of circumferentially spaced apertures 30 therethrough.

A plurality of support cables 32 are provided with each having inner ends 34 securable to the apertures 28 of the peripheral flange 28 of the support collars 24. Outer ends of the support cables 32 are looped 36 with rubber hosing 38 disposed thereon for engaging a tree limb.

In use, the stake portion 12 would be installed in the ground next to the base of the tree so that the plan upper end 16 of the stake portion 12 extended approximately twelve inches above the ground. The support pole could then be placed onto the stake portion 12 and locked into place at a predetermined height corresponding with the size of the tree. The support collars 24 would then slide onto the upper section 20 of the pole and locked into place using the screws 26. The support cables 32 would then be attached to the apertures 30 of the peripheral flange 28 and extended outwardly to support tree limbs and branches. As the tree grows, the support pole could be extended and the collars 24 and cables 32 repositioned according to the width and length of the branches.

Figure 4:
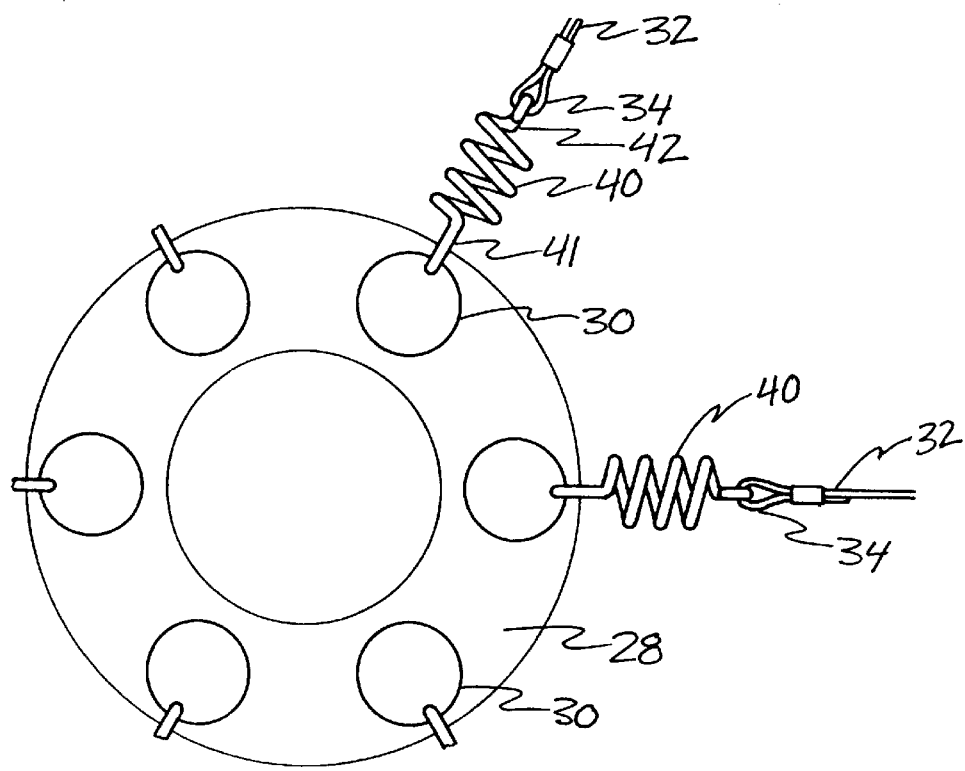
FIG. 4 is a top view of a broken away portion of the present invention particularly illustrating an optional spring feature.
Figure 5:
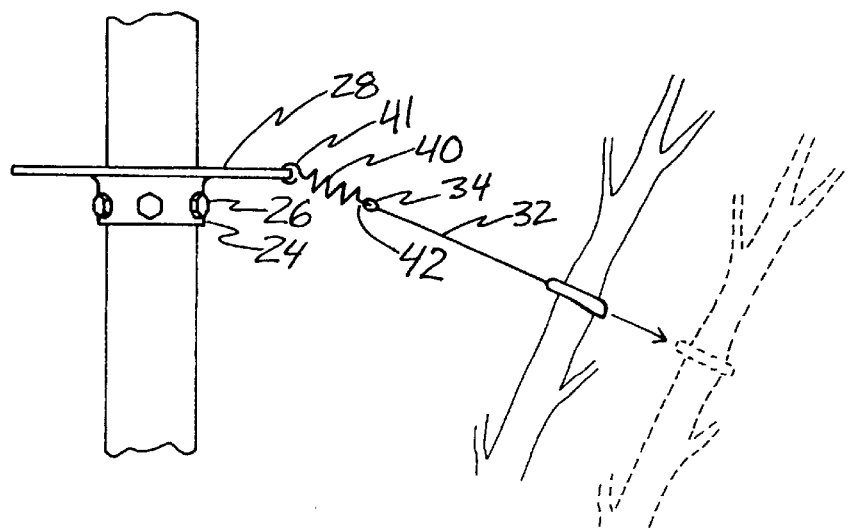
FIG. 5 is a side view of a broken away portion of the present invention particularly illustrating the spring feature with respect to a branch of a tree, and showing a range of branch positions possible with the spring feature.

FIGS. 4 and 5 of the drawings show the present invention with an optional and highly preferred spring feature. A spring 40 may be interposed between the inner end 34 of the support cable 32 and the aperture 30 of the peripheral flange 28 of the support collar 24. The interposition of the spring 40 between the support collar 24 and the support cable 32 permits the effective length of the support cable and the spring to be varied for a number of reasons, including length changes required as the supported tree grows, or to adjust the effective length for various branch positions, or to allow the movement of the branches during strong winds, or other conditions that require adjustment of the effective length. Additionally, the spring can help to gradually pull the branch in toward the trunk and therefore influence the growth of the branch inward rather than outward. The spring 40 is characterized by being biased against extension of the spring. The spring 40 has opposite ends 41, 42, with hooks being provided on each opposite end of the spring.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable support system for trees for stabilizing limbs and a trunk of a tree comprising:
    a support pole having an upper section and a lower section, the interior of the lower section telescopically receiving a lower end of the upper section such that the height of an upper end of the upper section above the ground surface may be adjusted to suit a tree for which the support pole is to be used and adjusted as the tree grows;
    a plurality of support collars having a central hole therethrough for slidably receiving a portion of the upper section of the support pole, each of the support collars having a peripheral flange extending through the collar outwardly into the central hole for engaging a portion of the upper section of the support pole, the peripheral flange having a plurality of circumferentially spaced apertures therethrough;
    a plurality of support cables each having inner ends securable to the apertures of the peripheral flange of the support collars, outer ends of the support cables being looped with hosing disposed thereon for engaging a tree limb; and
    a stake portion having a tapered lower end and a planar upper end, the tapered lower end being adapted for penetrating a ground surface adjacent to a tree;
    wherein an open lower end of the lower section is adapted to receive the planar upper end of the stake portion, the upper section having a plurality of apertures therethrough along a length thereof, and the lower portion having a pair of radially opposed screws extending inwardly thereof for mating with two of the plurality of apertures to fix a height of the upper section with respect to the lower section.

2. The adjustable support system for trees as set forth in claim 1 wherein the lower section has a substantially hollow interior with an internal diameter greater than an external diameter of the upper section, the lower section having an upper opening into the hollow interior thereof.

3. The adjustable support system for trees as set forth in claim 1 additionally comprising a mounting strap for coupling the lower section of the support pole to a trunk of a tree, the mounting strap extending around a portion of an upper portion of the lower section of the support pole for helping prevent pivoting of the support pole with respect to the trunk of the tree to be supported.

4. The adjustable support system for trees as set forth in claim 1 additionally comprising a spring interposed between the inner end of the support cable and the support collar for permitting the effective length of the support cable and the spring to be varied as the supported tree grows, the spring being characterized by being biased against extension of the spring, the spring having opposite ends with hooks provided on each opposite end of the spring.

5. An adjustable support system for trees for stabilizing limbs and a trunk of a tree comprising, in combination:
    a stake portion having a tapered lower end and a planar upper end, the tapered lower end being adapted for penetrating a ground surface adjacent to a tree, the stake portion having a length of over 24 inches between its upper and lower ends;
    a support pole having an upper section and a lower section, the lower section having a substantially hollow interior with an internal diameter greater than an external diameter of the upper section, the lower section having an upper opening into the hollow interior thereof, the interior of the lower section telescopically receiving a lower end of the upper section such that the height of an upper end of the upper section above the ground surface may be adjusted to suit a tree for which the support pole is to be used and adjusted as the tree grows, an open lower end of the lower section being adapted to receive the planar upper end of the stake portion, the upper section having a plurality of apertures therethrough along a length thereof, the lower portion having a pair of radially opposed screws extending inwardly thereof for mating with two of the plurality of apertures to fix a height of the upper section with respect to the lower section;
    a plurality of support collars having a central hole therethrough for slidably receiving a portion of the upper section of the support pole, the support collars each having four radially disposed screws extending through the collar inwardly into the central hole for engaging a portion of the upper section of the support pole, each of the support collars having a peripheral flange extending radially outwardly from the collar, the peripheral flange having a plurality of circumferentially spaced apertures therethrough;
    a plurality of support cables each having inner ends securable to the apertures of the peripheral flange of the support collars, outer ends of the support cables being looped with rubber hosing disposed thereon for engaging a tree limb;
    a mounting strap for coupling the lower section of the support pole to a trunk of the tree, the mounting strap extending around a portion of an upper portion of the lower section of the support pole for helping prevent pivoting of the support pole with respect to the trunk of the tree to be supported; and
    a spring interposed between the inner end of the support cable and the support collar for permitting the effective length of the support cable and the spring to be varied as the supported tree grows, the spring being characterized by being biased against extension of the spring, the spring having opposite ends with hooks provided on each opposite end of the spring;
    wherein a distance between the lower end of the stake portion and the ground surface when the stake portion is inserted in the ground is at least 12 inches;
    wherein a distance between the upper end of the stake portion and the ground surface when the stake portion is inserted in the ground is about 12 inches.

6. An adjustable support system for trees for stabilizing limbs and a trunk of a tree comprising:

a support pole having an upper section and a lower section, the interior of the lower section telescopically receiving a lower end of the upper section such that the height of an upper end of the upper section above the ground surface may be adjusted to suit a tree for which the support pole is to be used and adjusted as the tree grows;

a support collar having a central hole therethrough for slidably receiving a portion of the upper section of the support pole, the support collar having a peripheral flange extending through the collar outwardly into the central hole for engaging a portion of the upper section of the support pole, the peripheral flange having a plurality of circumferentially spaced apertures therethrough;

a plurality of support cables each having inner ends securable to the apertures of the peripheral flange of the support collar, outer ends of the support cables being looped with hosing disposed thereon for engaging a tree limb; and a spring interposed between the inner end of the support cable and the support collar for permitting the effective length of the support cable and the spring to be varied as the supported tree grows, the spring being characterized by being biased against extension of the spring, the spring having opposite ends with hooks provided on each opposite end of the spring.

7. The adjustable support system of claim 6 additionally comprising a stake portion having a tapered lower end and a planar upper end, the tapered lower end being adapted for penetrating a ground surface adjacent to a tree.

8. The adjustable support system of claim 6 wherein an open lower end of the lower section is adapted to receive the planar upper end of the stake portion, the upper section having a plurality of apertures therethrough.

9. The adjustable support system for trees as set forth in claim 6 wherein the lower section has a substantially hollow interior with an internal diameter greater than an external diameter of the upper section, the lower section having an upper opening into the hollow interior thereof.

10. The adjustable support system for trees as set forth in claim 6 additionally comprising a mounting strap for coupling the lower section of the support pole to a trunk of a tree, the mounting strap extending around a portion of an upper portion of the lower section of the support pole for helping prevent pivoting of the support pole with respect to the trunk of the tree to be supported.

* * * * *